United States Patent
Lauser et al.

(10) Patent No.: US 12,276,528 B2
(45) Date of Patent: Apr. 15, 2025

(54) FIREARM MOUNT

(71) Applicant: WHG PROPERTIES, LLC, North Wales, PA (US)

(72) Inventors: Adam Lauser, Coplay, PA (US); William H. Geissele, Lower Gwynedd, PA (US)

(73) Assignee: WHG PROPERTIES, LLC, North Wales, PA (US)

(*) Notice: Subject to any disclaimer, the term of this patent is extended or adjusted under 35 U.S.C. 154(b) by 344 days.

(21) Appl. No.: 18/052,678

(22) Filed: Nov. 4, 2022

(65) Prior Publication Data
US 2024/0151527 A1 May 9, 2024

(51) Int. Cl.
| | | |
|---|---|---|
| *F41G 1/38* | (2006.01) | |
| *F41G 1/34* | (2006.01) | |
| *F41G 1/44* | (2006.01) | |
| *G01C 9/28* | (2006.01) | |
| *G01C 9/32* | (2006.01) | |
| *G01C 9/34* | (2006.01) | |

(52) U.S. Cl.
CPC ............ *G01C 9/28* (2013.01); *F41G 1/34* (2013.01); *F41G 1/44* (2013.01); *G01C 9/32* (2013.01); *G01C 9/34* (2013.01)

(58) Field of Classification Search
CPC ............. F41G 1/38; F41G 1/383; F41G 1/387
USPC ............................................ 33/379
See application file for complete search history.

(56) References Cited

U.S. PATENT DOCUMENTS

| | | | | | |
|---|---|---|---|---|---|
| 2,782,511 | A | * | 2/1957 | Ivy | G02B 23/00 42/126 |
| 4,799,325 | A | * | 1/1989 | Booze | F41G 11/003 42/137 |
| 5,406,733 | A | | 4/1995 | Tarlton et al. | |
| 6,295,754 | B1 | * | 10/2001 | Otteman | F41G 11/003 42/111 |
| 6,508,026 | B1 | * | 1/2003 | Uppiano | F41G 1/38 42/122 |
| 6,584,720 | B1 | * | 7/2003 | Johnson | F41G 1/38 42/120 |
| 6,591,538 | B2 | * | 7/2003 | Holler | F41G 11/007 42/126 |

(Continued)

OTHER PUBLICATIONS

Midway USA, Wheeler Professional Reticle Leveling System, [retrieved from Internet Feb. 8, 2023] <https://www.midwayusa.com/product/1009244912?pid=189016> (11 pages).

(Continued)

*Primary Examiner* — George B Bennett
(74) *Attorney, Agent, or Firm* — Alston & Bird LLP

(57) ABSTRACT

Provided are various mounts, firearms, firearm components, and associated elements and methods. A mount for an at least partially curved body surface may include at least one body defining a clamping portion and a component portion connected to the clamping portion, and a level vial engaged with the component portion of the at least one body. The clamping portion may be configured to engage and secure the mount to the at least partially curved body surface, and the clamping portion may define at least two tangent contact surfaces configured to engage the at least partially curved body surface to secure the mount to the at least partially curved body surface.

20 Claims, 7 Drawing Sheets

(56) References Cited

U.S. PATENT DOCUMENTS

| | | | | |
|---|---|---|---|---|
| 8,051,574 | B1* | 11/2011 | Kronengold | F41G 1/467 124/87 |
| 8,171,666 | B2* | 5/2012 | Karagias | F41G 11/003 42/127 |
| 8,353,125 | B2* | 1/2013 | Riley | F41G 11/003 248/315 |
| 8,819,985 | B1* | 9/2014 | McCoy | F41G 11/001 42/111 |
| 9,500,443 | B2 | 11/2016 | McCoy, II et al. | |
| 10,619,977 | B2* | 4/2020 | Silvennoinen | F41G 11/003 |
| 10,935,347 | B2* | 3/2021 | Reis Green | F41G 1/38 |
| 10,962,321 | B2* | 3/2021 | Wynalda, Jr. | F41A 23/06 |
| 10,962,330 | B2* | 3/2021 | Senn | F41G 1/545 |
| 11,092,437 | B1* | 8/2021 | McCoy, II | F41G 1/54 |
| 12,025,406 | B2* | 7/2024 | Humphries | F41G 1/10 |
| 2017/0205200 | A1* | 7/2017 | Geissele | F41G 1/393 |
| 2018/0073840 | A1* | 3/2018 | Kristoffersen | F41G 1/16 |
| 2023/0221096 | A1* | 7/2023 | Ding | G08B 5/36 42/126 |
| 2024/0093967 | A1* | 3/2024 | Karagias | F41G 11/001 |

OTHER PUBLICATIONS

Solid Solution Designs, Accuracy Fist Scope Levels 34 MM LH, [retrieved from Internet Feb. 8, 2023] <https://www.solidsolutiondesigns.com/product/accuracy-first-scope-levels-34-mm-lh/> (4 pages).
MK Machining, Printed Throw Lever and Aluminum Level Combo, [retrieved from Internet Feb. 8, 2023] <https://www.mkmachining.com/product/printed-throw-lever-aluminum-level-combo-2/?utm_source=Google+Shopping&utm_medium=cpc&utm_campaign=All+Products&gclid=EAIaIQobChMIo97u8ie-AIVi4jICh27Sg6mEAQYBCABEgI5J_D_BwE#throw-lever> (4 pages).
EHobby Asia, Blackcat Adjustable Heavy Duty 25-30mm Bubble Level Scope Mount Ring (Tan) [retrieved from Internet Feb. 8, 2023] <https://www.ehobbyasia.com/products/blackcat-adjustable-heavy-duty-25-30mm-bubble-level-scope-mount-ring-tan> (2 pages).
Kestral Ballistics, Accuracy $1^{st}$ Scope Level with 34mm Reducer Ring Tan, [retrieved from Internet Sep. 15, 2022] <https://kestrelballistics.com/accuracy-1st-scope-level-34mm-1> (4 pages).
Kestral Ballistics, Accuracy $1^{st}$ Scope Level with 30mm Reducer Ring Tan, [retrieved from Internet Sep. 15, 2022] <https://kestrelballistics.com/accuracy-1st-scope-level-30mm-reducer-ring-1> (4 pages).
Extravision, Vortex Low Pro Bubble Level 30mm, [retrieved from Internet Sep. 15, 2022] <https://www.extravision.com.au/products/vortex-low-pro-bubble-level-30mm> (5 pages).
ExtraVision, Bubble Level for 35mm Riflescope Tube, [retrieved from Internet Sep. 15, 2022] <https://www.extravision.com.au/products/bubble-level-for-35mm-riflescope-tube> (5 pages).
Accuracy $1^{st}$, Scope Level—Black Anodized Aluminium—Including 30mm Reducer Ring, [retrieved from Internet Sep. 15, 2022] < https://accuracy1st.com/collections/6-69/A1DG.L30.BA.C-Scope-Level-Black-Anodized-Aluminium-Including-30mm-Reducer-Ring/> (3 pages).
Accuracy $1^{st}$, Scope Level—34mm/35mm Cerakote RAL 8000, [retrieved from Internet Sep. 15, 2022] <https://accuracy1st.com/collections/6-67/A1DG.L34.001.RAL.C-Scope-Level-34mm-35mm-Cerakote-RAL-8000/> (3 pages).
A&J Sporting LLC, Anarchy Outdoors Riflescope Anti-Cant Bubble Level, [retrieved from Internet Sep. 15, 2022] < https://aandjsporting.com/anarchy-outdoors-riflescope-anti-cant-bubble-level/> (4 pages).
A&J Sporting LLC, MK Machining Aluminum Hinged Bubble Level, [retrieved from Internet Sep. 15, 2022] < https://aandjsporting.com/mk-machining-aluminum-hinged-bubble-level/> (4 pages).
A&J Sporting LLC, MK Machining Bubble Level, [retrieved from Internet Sep. 15, 2022], < https://aandjsporting.com/mk-machining-bubble-level/> (4 pages).
Tritium Vials, Tritium Safety Markets, Tritium Key Fobs and Titanium Items, T1.5×3×16G Vials, [retrieved from Internet Sep. 15, 2022], <https://www.mixglo.com/store/p28/T1.5x3x16G_Vials.html> (8 pages).
Sniper's Hide Forum, *Sold!* Accuracy First 34mm Tan Level *w/Tritium!*, [retrieved from Internet Sep. 15, 2022], <https://www.snipershide.com/shooting/threads/sold-accuracy-first-34mm-tan-level-w-tritium.6951530/, <6 pages).
Sniper's Hide shooting attachment, 1f139de6-ed84-4fcb-a8ec-dece6ebb509c-jpeg.7110311 (2048×1536), [retrieved from Internet Sep. 15, 2022], <https://www.snipershide.com/shooting/attachments/ 1f139de6-ed84-4fcb-a8ec-dece6ebb509c-jpeg.7110311/> (1 page).
A&J Sporting LLC, Burris Bubble Level, [retrieved from Internet Sep. 15, 2022], <https://aandjsporting.com/burris-bubble-level/> (4 pages).

* cited by examiner

FIREARM MOUNT

TECHNICAL FIELD

The present disclosure relates to a mount for a firearm and/or firearm component. In various embodiments, the mount may contain tangent contact surfaces to increase the clamping force.

BACKGROUND

Firearms may be assembled with a number of components, including accessories, coupled thereto to perform a variety of functions. For example, firearms may use components, such as attachable accessories (e.g., optical sights, such as a scope, levels, flashlights, other optical sights, backup sights, lasers, etc.), to improve performance of the weapon, such as through improving the user's shooting accuracy by allowing more precise and accurate targeting, and such accessories may have additional components (e.g., levels, lasers, or other components) mounted thereto.

When installing or repositioning such a component with on a firearm, either directly or indirectly (e.g., mounting a component onto another component), the various mounting surfaces may comprise abnormal, complex, and/or curved shapes that make attachment difficult. Moreover, the variety of different possible surface contours associated with firearms and firearm components have made adjustable and/or universal mounting solutions impractical.

Through applied effort, ingenuity, and innovation, Applicant has solved problems relating to the aforementioned technologies by developing solutions embodied in the present disclosure, which are described in detail below.

BRIEF SUMMARY

The present disclosure relates to mounts, firearms, firearm components, and associated elements and methods.

Various embodiments of the present disclosure may include a mount for attaching a component directly or indirectly to a firearm. In some embodiments, the mount may include at least one body defining a clamping portion and a component portion connected to the clamping portion. The clamping portion may be configured to engage and secure the mount directly or indirectly to a firearm. The clamping portion may define at least two tangent contact surfaces configured to engage at least partially curved body surface.

In some embodiments, the at least two tangent contact surfaces of the clamping portion comprise four tangent contact surfaces oriented inward towards an axis and configured to face the at least partially curved body surface in an instance in which the mount is installed on the at least partially curved body surface. In some embodiments, the at least one body comprises two bodies configured to engage each other. In some embodiments, the mount may include one or more fasteners configured to connect the first body and the second body. In some embodiments, the two fasteners may be disposed on opposite sides of the axis. In some embodiments, the first body and the second body may be configured to translate relative to each other in an instance in which the two fasteners are advanced by equal amounts. The two bodies may include a first body defining an upper clamping portion and a second body defining a lower clamping portion, wherein the upper clamping portion and lower clamping portion are configured to at least partially surround the curved body surface.

In some embodiments, the first body may further include the component portion. In some embodiments, the first clamping portion and the second clamping portion may be configured to define the firearm component axis therebetween in an instance in which the first body and the second body are engaged. At least one of the first body and the second body may include the at least two tangent contact surfaces, and the at least two tangent contact surfaces may be oriented at least partially toward the at least partially curved body surface. In some embodiments, the at least two tangent contact surfaces may comprise four tangent contact surfaces, wherein each of the four contact surfaces may be oriented at least partially towards an axis. In some embodiments, the first body may comprise the first tangent contact surface and the second tangent contact surface, and the second body may comprise a third tangent contact surface and a fourth tangent contact surface. In some embodiments, the first tangent contact surface may be parallel to the third tangent contact surface and the second tangent contact surface may be parallel to the fourth tangent contact surface.

In some embodiments, the component portion may be configured to support a level vial. In some embodiments, at least two tangent contact surfaces may comprise of a first tangent contact surface and a second tangent contact surface, wherein the component portion may define a leveling axis of the level vial. In some embodiments, the leveling axis of the level vial may be configured to be disposed in an instance in which the level vial indicator is centered, where each of the at least two tangent contact surfaces may be oblique to the leveling axis.

In some embodiments, the component portion may include a recess configured to receive a tritium vial. The component portion may include an opening configured to receive the leveling vial therethrough, and the opening may be disposed opposite the recess, such that the leveling vial is configured to be disposed between the tritium vial and the opening.

Various embodiments may include firearm comprising the mount and the component according to various embodiments of the present disclosure. In some embodiments, the firearm accessory may define the at least partially cylindrical body. In some embodiments, the firearm accessory may comprise an optical sight and the component may comprise a level vial. In some embodiments, the firearm may define the at least partially cylindrical body.

The above summary is provided merely for the purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Having thus described embodiments of the disclosure in general terms, reference will now be made to the accompanying drawings, which are not necessarily drawn to scale. The following drawings are illustrative of particular embodiments of the present disclosure and do not limit the scope of the present disclosure. Moreover, the drawings are intended for use in conjunction with the explanations provided herein.

Example embodiments of the present disclosure will hereinafter be described in conjunction with the appended drawings.

Figure 1B:
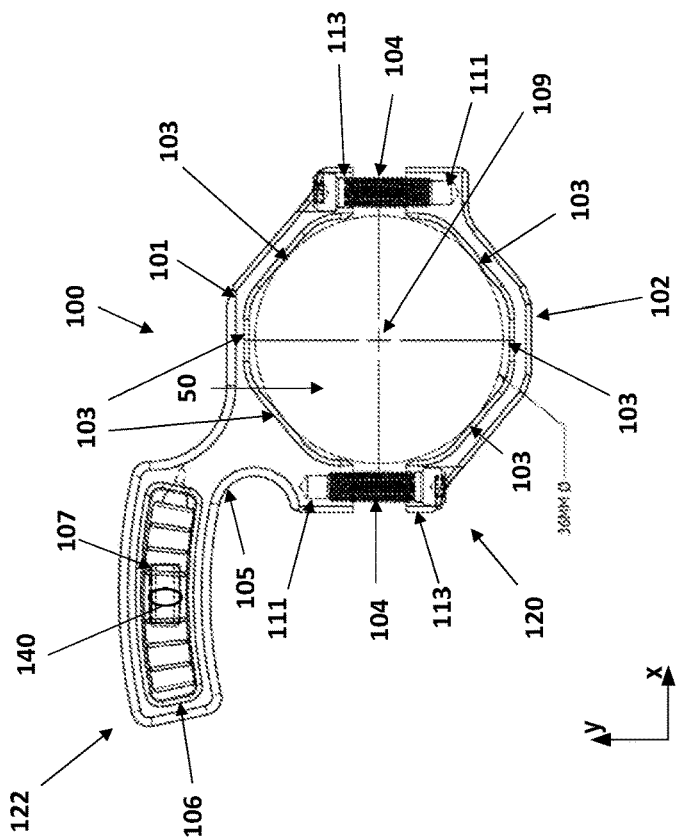
Figure 1A:
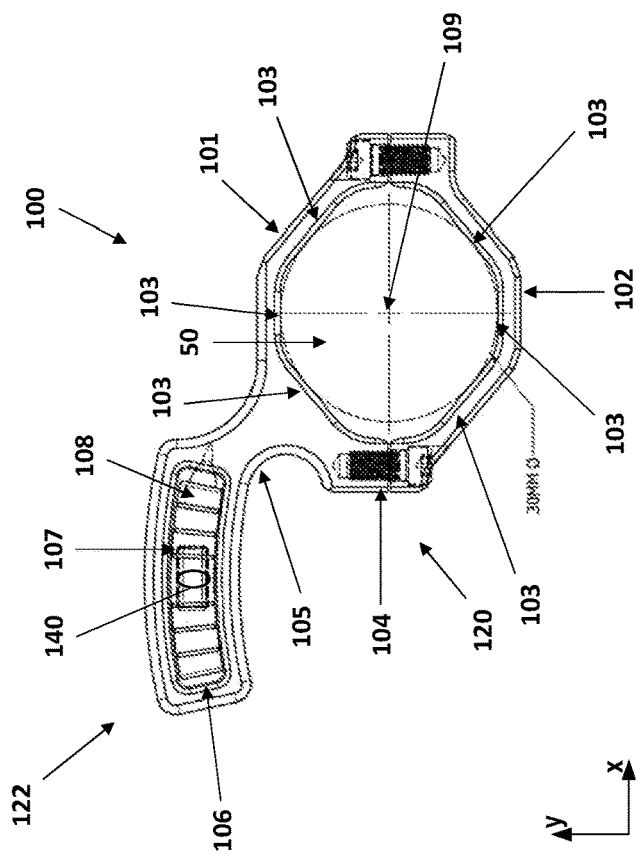

FIGS. 1A-1B illustrates a rear view of a mount engaged with two different circumferences of the at least partially curved body surface in accordance with various embodiments of the present disclosure.

Figure 2:
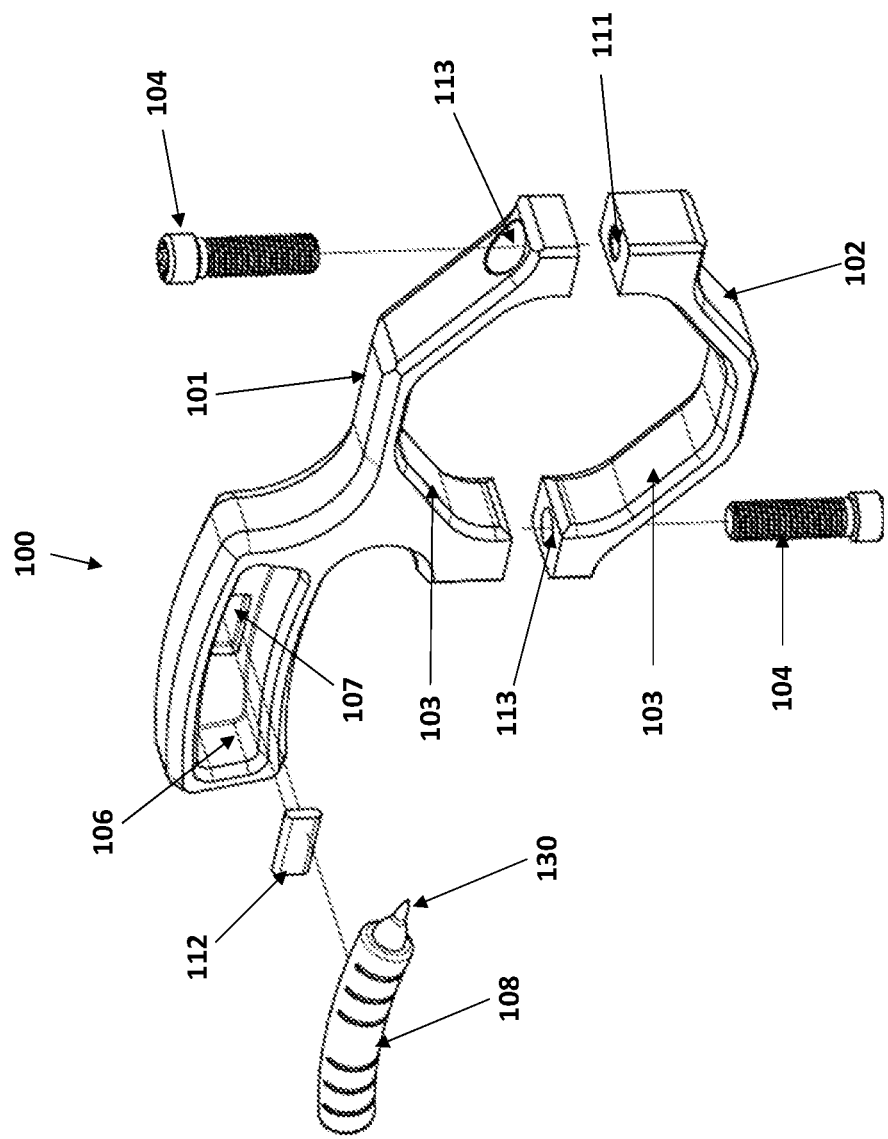

FIG. 2 illustrates an exploded view of the mount in accordance with various embodiments of the present disclosure.

Figure 3:
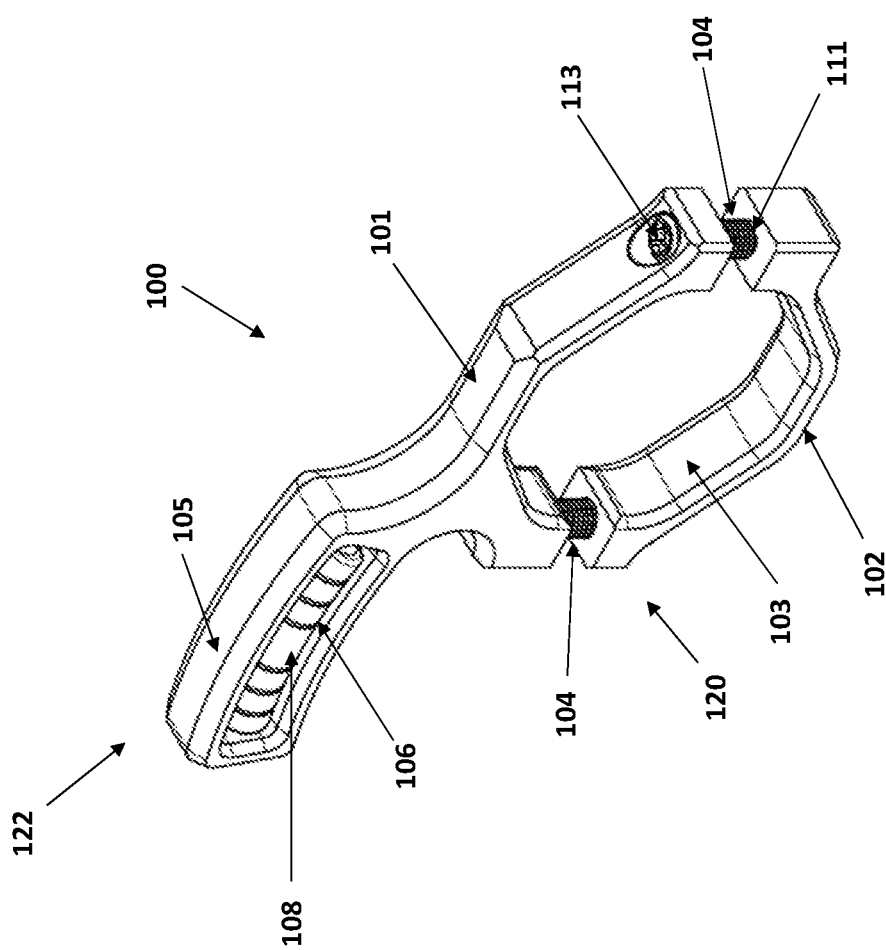

FIG. 3 illustrates a side perspective view of the mount in accordance with various embodiments of the present disclosure.

Figure 4:
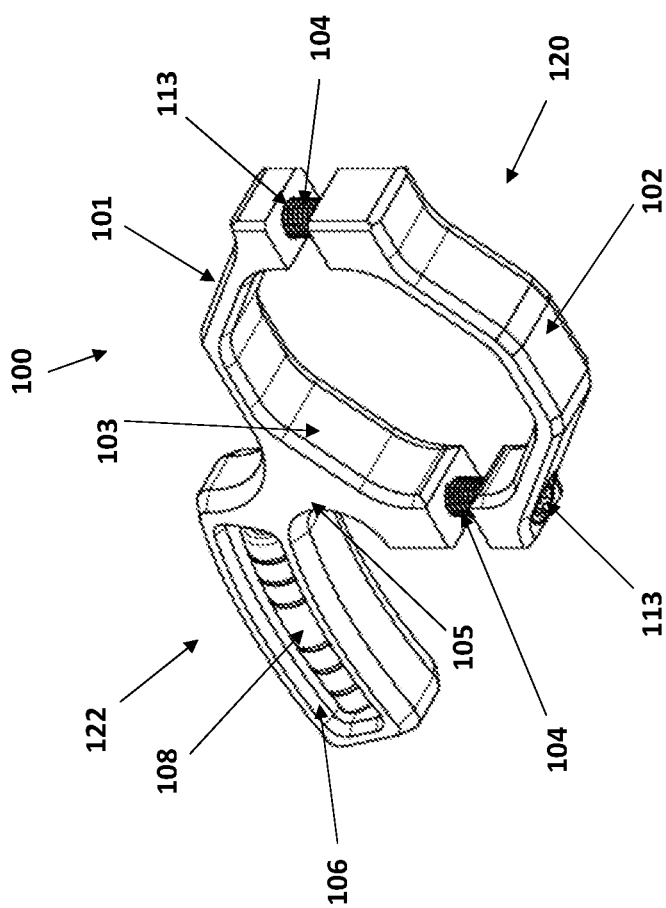

FIG. 4 illustrates a bottom perspective view of the mount in accordance with various embodiments of the present disclosure.

Figure 5:
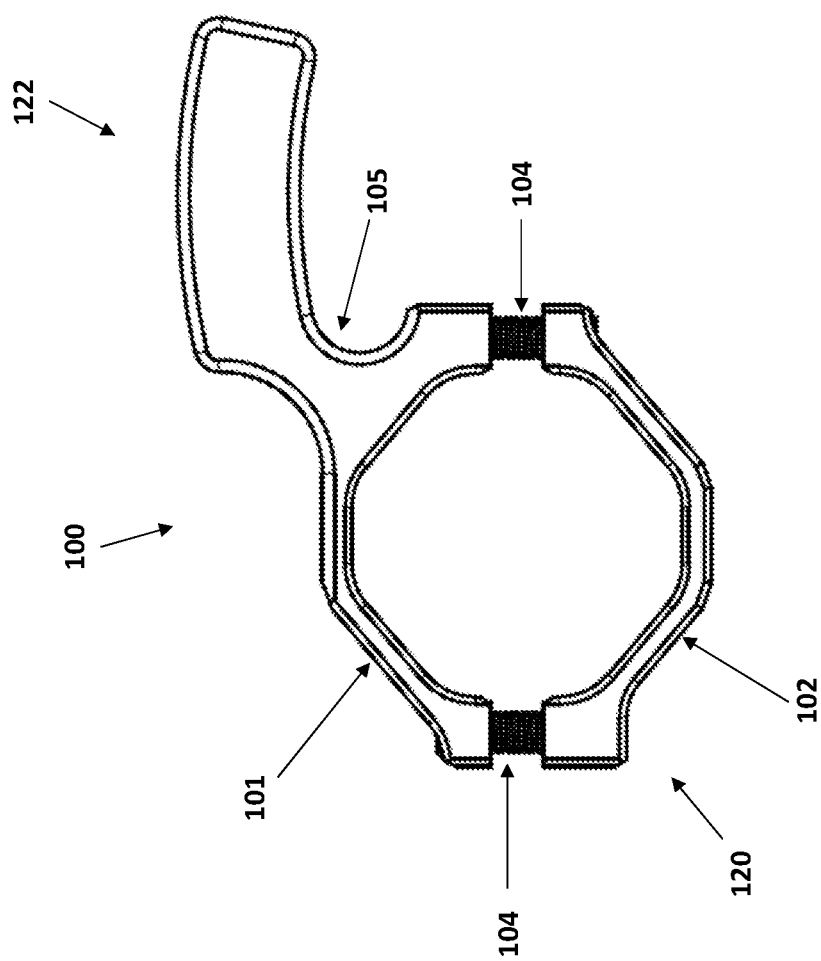

FIG. 5 illustrates a front view of the mount in accordance with various embodiments of the present disclosure.

Figure 6:
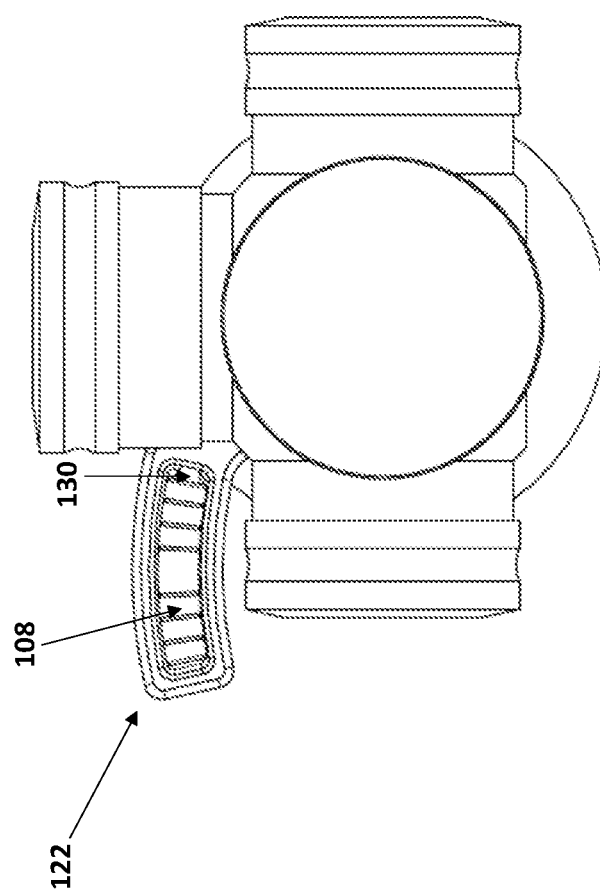

FIG. 6 illustrates a back view of the mount attached to an example optical sight in the form of a rifle scope accordance with various embodiments of the present disclosure.

Figure 7:
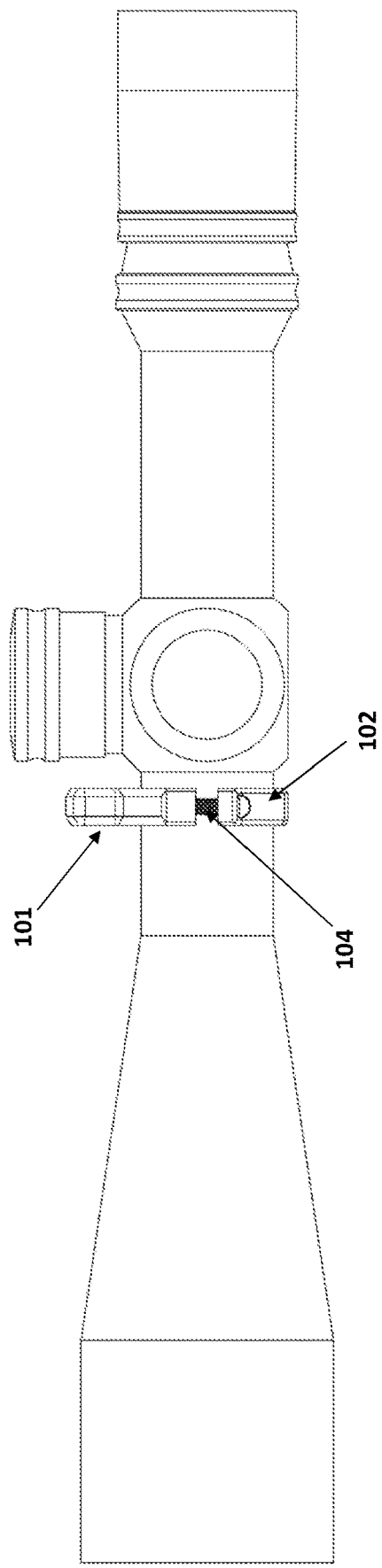

FIG. 7 illustrates a side view of the mount attached to an example optical sight in the form of a rifle scope in accordance with various embodiments of the present disclosure.

DETAILED DESCRIPTION

Some embodiments of the present inventions will now be described more fully hereinafter with reference to the accompanying drawings, in which some, but not all, embodiments of the inventions are shown. Like reference numerals refer to like elements throughout. Indeed, various embodiments of the invention may be embodied in many different forms and should not be construed as limited to the embodiments set forth herein. Rather, these embodiments are provided so that this disclosure will satisfy applicable legal requirements.

As used herein, terms such as "front," "rear," "top," etc. are used for explanatory purposes in the examples provided below to describe the relative positions of certain elements or portions of elements. As used herein, the term "or" is used in both the alternative and conjunctive sense, unless otherwise indicated. The term "along," and similarly utilized terms, means near or on, but not necessarily requiring directly on an axis, edge, or other referenced location. The terms "approximately," "generally," and "substantially" refer to within manufacturing and/or engineering design tolerances for the corresponding materials and/or elements unless otherwise indicated. The use of such terms is inclusive of and is intended to allow independent claiming of specific values listed. Thus, use of any such aforementioned terms, or similarly interchangeable terms, should not be taken to limit the spirit and scope of embodiments of the present invention. As used in the specification and the appended claims, the singular form of "a," "an," and "the" include plural references unless otherwise stated. The terms "includes" and/or "including," when used in the specification, specify the presence of stated features, elements, and/or components; it does not preclude the presence or addition of one or more other features, steps, operations, elements, components, and/or groups thereof.

As used herein, "horizontal" refers to a direction along the x-axis shown in FIGS. 1A-1B and "vertical" refers to a direction along the y-axis shown in FIGS. 1A-1B. In each instance, the terms "horizontal" and "vertical" should not be interpreted as requiring the described elements to be held at a particular orientation relative to the earth or some other reference point in all instances unless stated otherwise, and these directions are provided for convenience to illustrate the relative positions between the described elements (e.g., a horizontal element may be expected to be perpendicular to a vertical element within their limited reference frame with all else being equal). For example, in an instance in which a level and a firearm component (e.g., an accessory, like an optical sight, such as a scope) are perfectly aligned with the firearm and the level vial indicator 140 in the level vial 108 is showing a horizontal, level orientation, the x-axis in FIG. 1A may be horizontal and the y-axis in FIG. 1B may be vertical relative to the earth.

The figures of the current embodiment of the invention are not necessarily drawn to scale and are provided to illustrate some examples of the invention described. The figures are not to limit the scope of the present embodiments of the inventions or the appended claims. Aspects of the example embodiments are described below with reference to example applications for illustration. It should be understood that specific details, relationships, and methods are set forth to provide a full understanding of the example embodiments. One of ordinary skill in the art recognize the example embodiments can be practiced without one or more specific details and/or with other methods.

Embodiments of the present disclosure relate generally to mounts configured to support one or more components; mounts configured to engage a firearm or one or more components attached to a firearm; the components, including levels, optical sights, lasers, red dot sights, flashlights, etc.; corresponding firearms; and corresponding methods. In some embodiments, the firearm and/or firearm components (e.g., accessories) may include an at least partially curved body surface to which various embodiments of a mount may be configured to attach. Non-limiting embodiments of the mounts and corresponding components, including various accessories, are described below with reference to FIGS. 1A-7.

The present disclosure includes embodiments of a mount for at least partially curved body surfaces associated with a firearm. The mount may attach to an accessory (e.g., optical sight, such as a scope), and/or directly to the firearm (e.g., to a barrel). In some embodiments, the mount may be configured to hold a component on the accessory and/or directly on the firearm (e.g., a level to facilitate alignment of the accessory with the firearm).

For example, in one set of embodiments, the mount may be configured to hold a level. When installing or repositioning an accessory, such as an optical scope as well as other weapon accessories (e.g., flashlight, other optical sights, backup sights, lasers, etc.), the user may need to align the accessory (e.g., optical sight, such as a scope) with the body of the firearm. For example, in some instances, the accessory may be rotatable about its longitudinal axis, and at least a portion of the alignment process may require rotationally aligning portions of the accessory (e.g., optical sight) with a horizontal and/or vertical axis. In some such instances, optical sights may utilize reticles, crosshairs, or other alignment features that utilize markings intended to be installed in a predetermined rotational orientation relative to the firearm. Moreover, some firearm accessories, such as telescopic scopes, have adjustable alignment features that may be moved horizontally and/or vertically (e.g., via turning adjustment knobs) while the body of the accessory remains fixed to the firearm, thereby allowing the user to zero the firearm accessory (e.g., optical sight) and allowing firing under a variety of shooting conditions (e.g., conditions such as wind, parallax, range, elevation, etc.). These adjustment mechanisms may also perform optimally when the firearm accessory is rotationally aligned with the firearm by ensuring that the alignment features can be moved in purely horizontal directions, purely vertical directions, or a mixture thereof.

Various of the aforementioned embodiments may include a mount configured to engage an accessory, and some embodiments may include a level for rotationally aligning such accessories. For example, the accessory (e.g., optical sight, such as a scope) may attach to the firearm via a rail mechanism or similar mounting structure. The mount may attach directly to the accessory for holding another component on the accessory. In some embodiments, the component may be a level for at least rotationally aligning the accessory with the firearm about an accessory (e.g., optical sight, such as a scope) axis that may be parallel to a barrel axis of the firearm, such that the orientation of the accessory matches the orientation of the firearm. For example, a vertical crosshair line of the accessory (e.g., optical sight, such as a scope) designed to be oriented upwards during firing may be aligned with a vertical direction of the firearm.

In so aligning the firearm and the firearm accessory, the user may more efficiently operate the firearm. For example, a cross-hairs shown by an optical sight, such as a scope, may include a vertical and horizontal indicator (e.g., lines of the cross-hair), and, once aligned, the horizontal indicator may be expected to align with a horizon when the firearm is held in a neutral, level position so that the user can track and visualize a target relative to the sight cross-hairs. Similarly, if a user needs to adjust the firearm accessory, such as by zeroing a sight using built-in adjustment features, the adjustment features may include adjustments in the horizontal and vertical directions, such that once the accessory (e.g., optical sight, such as a scope) is aligned with the firearm and the firearm is held in a neutral, level position, the respective horizontal and vertical adjustments correlate to a purely horizontal adjustment and a purely vertical adjustment.

In some embodiments, the mount may be configured to engage a firearm barrel. For example, a laser, optical sight, or other accessory may be attached to the firearm barrel using the mount disclosed herein. In some embodiments, the mount may be configured to engage either the firearm or a component attached to the firearm. The mount may engage the at least partially curved body surface with a clamping portion. Traditional clamps may be rounded and may only be configured to engage a single size and shape of surface without adding or removing shims or replacing portions of the mount. In some embodiments of the present disclosure, the mount may be adjustable to fit the plurality of external shapes and diameters of firearm components (e.g., accessories) and/or parts of the firearm. For example, the mount may include tangent contact surfaces in the interior of the clamping portion that may engage a plurality of diameters of firearms or firearm components without slipping and, in some embodiments, without adding or removing elements such as shims, inserts, or the like. A lateral cross section of the tangent surfaces are defined as a straight line or convex line relative to the surface on which it is mounted. The mount may include two or more bodies that engage the corresponding surface and move relative to each other to accommodate different sizes of accessories, including different portions or cross-sectional locations on a single firearm accessory. In some embodiments, the component portion may support a component and the clamping portion may be configured to clamp directly or indirectly onto a firearm (e.g., clamp to a surface of the firearm, such as the barrel, or to a firearm accessory, such as an optical sight). In some embodiments, the component portion may be shaped to support the corresponding component therein.

As used herein, the "tangent contact surfaces" and similar terms may refer to contact surfaces configured to engage a firearm or a firearm component (e.g., an accessory) with small, tangent areas of the contact surface (e.g., line contact rather than curved surfaces matching the exterior shape of the accessory for maximum contact area). The "tangent" contact surfaces may refer to any surface that is not concave towards the surface contacted by the tangent contact surfaces along at least one axis, including but not limited to, flat planar surfaces and convex surfaces. In some embodiments, the tangent contact surfaces may be configured to engage at least partially curved body surfaces. In some embodiments, the tangent contact surfaces may have different profiles in different directions, such as being convex in a front-to-rear direction and planar in a lateral direction. In some embodiments, the tangent contact surfaces may be able to grip different firearm accessories at different points along the contact surface (e.g., to grip accessories having different diameters).

In some embodiments, users may also need to easily visualize the position of a level vial indicator (e.g., a bubble within a level) during adverse conditions to quickly adjust the firearm accessory. In various embodiments, the mount may include a component portion with a level vial inserted therein. In some embodiments, the component portion may be offset relative to a vertical axis of the firearm accessory, such that the component portion is configured to extend from one side (e.g., a left or right side, the elements may be reversible) of the accessory when installed. In embodiments using a level, such positioning may improve visibility and mechanically improve the level indication. In some embodiments, the component portion 122 may include a recess 107 at or proximate a center of the operational position of the leveling vial 108 that may be configured to hold a tritium vial or other illumination source 112. The illumination source may provide a backlight for the level vial indicator 140 of the level vial 108.

In some example embodiments, as shown in the embodiment of FIGS. 1A and 1B, the embodiment may contain one or more tangent contact surfaces which are planar in shape. In some embodiments, the tangent contact surfaces may be convex in shape relative to a surface of the firearm and/or the firearm component (e.g., curving at least partially away from the accessory along at least one plane). Further, in various embodiments, the one or more tangent clamping surfaces may comprise of a combination of two or more types of tangent surfaces either along the same direction or in different directions along the surface.

In the depicted embodiments of FIGS. 1A-7, an example mount is shown having a clamping portion configured to engage a firearm component (e.g., an optical sight) and a component portion configured to support a level for leveling the optical sight. While illustrated for example purposes, the scope of the present disclosure should not be so limited to solely a level mount or to solely a mount for attaching to an optical sight. Instead, one or more embodiments of the present disclosure may include a mount capable of being attached to any firearm or firearm component (including, but not limited to, optical sights) and capable of supporting any firearm component (including, but not limited to, levels) using the clamping portion and/or component portion structures shown or described herein.

FIGS. 1A-1B, illustrate a rear view of an example embodiment of the mount 100 for mounting on at least partially curved body surfaces 50 with one or more different diameters (e.g., a 30 mm diameter in FIG. 1A and a 36 mm diameter in FIG. 1B). The depicted views are illustrative of what a user would see when holding the rifle and looking towards the muzzle end from the buttstock end. In the depicted example embodiment, the mount 100 comprises one or more bodies, including a first body 101 (e.g., the top body in the depicted view) and a second body 102 (e.g., the bottom body in the depicted view).

In an example embodiment, the mount 100 includes a clamping portion 120 and a component portion 122. In some embodiments, the clamping portion 120 may comprise one or more structures, whether in a single piece or multiple pieces, that serve to engage and rigidly hold the mount 100 to the at least partially curved body surface 50. In various embodiments, the firearm and/or firearm component (e.g., an accessory such as an optical sight) may define, at least in part, a cylindrical body. In some embodiments, the component portion 122 may comprise one or more structures, whether in a single piece or multiple pieces, configured to hold a level vial 108 at a fixed orientation relative to the at least partially curved body surface (e.g., optical sight, such as a scope) 50 when the clamping portion 120 is rigidly engaged with the firearm component. In various embodiments, the component portion 122 may be shaped to hold any component therewith.

In the depicted embodiment, by way of example, the second body 102 and the portion of the first body 101 that engages the at least partially curved body surface of a firearm or firearm component 50 (e.g., an optical sight) define the clamping portion 120, and the portion of the first body 101 that may hold a level vial 108 defines the component portion 122. The mount 100 may include a component portion 122 configured to support a component and a clamping portion 120 configured to engage the firearm, either directly or indirectly. One example of the component portion 122 is a leveling portion in an instance in which the mount is for a level. The first body 101 (e.g., top body) defines an upper clamping portion of the clamping portion 120 of the mount 100, and the second body 102 (e.g., bottom body) defines a lower clamping portion of the clamping portion 120 of the mount 100. The clamping portion 120 is configured to at least partially encircle (e.g., cover greater than 50% of the circumference to prevent the mount from inadvertently detaching) the at least partially curved body surface 50 in a plane perpendicular to the firearm component axis 109, which firearm component axis may, in some embodiments, be parallel to a barrel of the firearm. For example, in the depicted embodiment, the clamping portion 120 completely encircles the at least partially curved body surface 50 on a plane perpendicular to the firearm component (e.g., optical sight) axis 109. In the example embodiment, the upper clamping portion and the lower clamping portion are configured to define the firearm component axis when the first body 101 engages with the second body 102. The two bodies 101, 102 are depicted in engagement with each other via fasteners 104 (e.g., screws).

In various embodiments, at least one body may comprise at least one tangent contact surface 103 facing inwardly towards the at least partially curved body surface 50 to apply a clamping force to the body surface, securing the mount on the body surface. In some embodiments, the at least one body may comprise at least two tangent contact surfaces. In some embodiments, the at least one body may comprise at least three tangent contact surfaces. In some embodiments, the at least one body may comprise at least four tangent contact surfaces. In some embodiments, the first body 101 may include at least one tangent contact surface 103, and the second body 102 may include at least one tangent contact surface 103. For example, in the depicted embodiment the first body 101 includes at least two tangent surfaces 103 and the second body 102 includes at least two tangent contact surfaces 103. Four of the depicted tangent contact surfaces 103 are angled relative to the crosshairs shown in FIGS. 1A, 1B. With reference to FIG. 1A, in some embodiments, additional tangent contact surfaces (e.g., the depicted horizontal tangent contact surfaces 103 at the top and bottom of the interior of the clamping portion 120) may engage the at least partially curved body surface 50 depending upon the size of the firearm or firearm component (e.g., optical sight) (e.g., the top and bottom tangent contact surfaces 103 engage the at least partially curved body surface 50 in the embodiment of FIG. 1A but not in the embodiment of FIG. 1B). The tangent contact surfaces 103 in the example embodiment are oriented inward towards the at least partially curved body surface 50, facing the surface (e.g., a surface of an optical sight) and a firearm component axis 109 defined longitudinally along the firearm accessory at a center point between the tangent contact surfaces 103.

In some embodiments, the first body (e.g., top body) 101 and the second body (e.g., bottom body) 102 engage with each other to define the firearm component axis, which may be disposed along a center of the firearm component or portion of the firearm to which the mount is attached (e.g., an optical sight, such as a scope). In the depicted embodiment, the first body (e.g., top body) 101 contains at least two tangent contact surfaces 103 and the second body (e.g., bottom body) 102 contains at least two tangent contact surfaces 103. In some embodiments, at least one pair of tangent contact surfaces 103 may be parallel to each other or may have at least sections that are parallel to each other (e.g., for a convex shaped surface). For example, as depicted, the upper left tangent contact surface 103 and the lower right tangent contact surface 103 are parallel. Similarly, the upper right tangent contact surface and the lower left tangent contact surface 103 are parallel. In some embodiments, the left vertical wall and the right vertical wall may be parallel to each other.

In some embodiments, the two or more of the tangent contact surfaces may be moved relative to each other to modify the size of firearm portion and/or component 50 that fits inside the clamping portion 120 of the mount 100. For example, the spacing between the tangent contact surfaces 103 of the first body 101 and the tangent contact surfaces 103 of the second body 102 may be controlled, such as by the depicted fasteners 104. As shown, the fasteners 104 on the left and right side of the clamping portion comprise screws that may be rotated and/or replaced to engage larger or smaller cross-sections of one or more firearm accessories. For example, the fasteners in FIG. 1A are shorter than the fasteners in FIG. 1B. In some embodiments, the fasteners 104 may be oriented parallel to each other. The mount 100 may thereby automatically engage the at least partially curved body surface 50 as the fasteners 104 are tightened.

Moreover, the tangent contact surfaces 103 may facilitate uniform engagement between the mount 100 and the at least partially curved body surface 50 across many different sizes of firearm accessories. For example, a rounded profile for the clamping portion would be configured to grip a specific size firearm portion or component (e.g., optical sight) but would fail or be inadequate for engaging any other size firearm portion or component. In contrast, the depicted embodiment ensures that the tangent contact surfaces 103 contact the at least partially curved body surface 50 in at least four locations, with the specific location of contact differing along the tangent contact surface depending on the diameter of the firearm portion or component (e.g., optical sight) being gripped. The tangent contact surfaces 103 allow the same grip quality for each of the multiple sizes. For example, in the example embodiment shown in FIGS. 1A-1B, the depicted firearm component (e.g., optical sight, such as a scope) may be 30 mm in diameter (e.g., as shown in FIG. 1A), 31 mm in diameter, 32 mm in diameter, 33 mm in diameter, 34 mm in diameter, 35 mm in diameter, or 36 mm in diameter. In some embodiments, the mount may be configured to fit other ranges of diameters.

As illustrated, the width of the interior of the clamping portion 120 does not change based on the fastener adjustments 104 and only the height of the interior changes as the first body 101 and the second body 102 change their relative position. In such example embodiments, the width of the interior of the clamping portion 120 may define the maximum size of the component and/or portion of the firearm defining the at least partially curved surface 50 that fits the mount (e.g., the at least partially curved body surface 50 is depicted contacting the distal edges of the upper clamping portion and the lower clamping portion in FIG. 1B). Thus, in the depicted embodiment of FIG. 1A, the horizontal width of the interior of the clamping portion 120 is greater than the vertical height of the interior of the clamping portion, and the at least partially curved body surface (e.g., optical sight) 50 contacts the tangent contact surfaces 103 closer to a vertical plane in which the firearm component axis 109 is disposed. In the depicted embodiment of FIG. 1B, the horizontal width of the interior of the clamping portion 120 is equal to or substantially equal to the vertical height of the interior of the clamping portion, and the at least partially curved body surface 50 contacts the tangent contact surfaces 103 approximately midway along each tangent contact surface. In some embodiments, the mount 100 may be configured perpendicular to the illustrated embodiment, such that the first body and second body form left and right sides of the mount with the width changing sizes based on movements of the fastener.

In operation, the mount 100 may be installed by positioning the two bodies 101, 102 on either side of the object to which the mount is attached (e.g., the firearm or firearm component) and inserting screws into the screw openings 111, 113 on either side of the bodies to draw the bodies closer to each other until the tangent surfaces 103 snugly secure against the at least partially curved body surface 50, prohibiting relative rotation between the mount 100 and body surface (e.g., optical sight, such as a scope). In the example embodiment, the fasteners (e.g., screws) 104 engage with the first and second body via the fastener openings 111 and 113. For example, each fastener 104 may be a threaded fastener, and the threaded fastener may be configured to engage both a narrow opening 111 comprising threading and a wide opening 113, which may or may not comprise threading, opposite the narrow opening. The threaded fasteners 104 may engage the threading of the respective narrow openings 111 to pull the bodies 101, 102 closer together. In the depicted embodiment, the fasteners 104 are disposed on opposite sides of the firearm component axis 109.

The fasteners 104 may engage the first body 101 and the second body 102 in a manner that allows the two bodies 101 and 102 to move respectively upwards and downwards to each other with equal advance (e.g., by turning the fasteners equally to keep the bodies aligned during tightening). In this manner, the mount 100 for the at least partially curved body surface (e.g., optical sight) 50 of the firearms may be adjustable, while still obtaining clamping force to keep the body surface from slipping relative to the mount. The fasteners 104 may adjust the first body 101 (e.g., top body) and the second body 102 (e.g., bottom body) according to the circumference of the portion of the firearm and/or component 50 to obtain a secure fit.

The mount 100 may include a component portion 122 which supports a leveling vial 108 having a level vial indicator 140 (e.g., a bubble, bead, or other indicator that shows a level orientation) for providing the user feedback on the rotational alignment of a firearm component. The leveling vial 108 may define a leveling axis defined as a longitudinal axis of the vial that is configured to be disposed horizontal in an instance in which the level vial indicator 140 is in a level orientation (e.g., the leveling axis may be disposed parallel to the x-axis in FIGS. 1A-1B in an instance in which the mount is in a neutral, level position with the level vial indicator 140 at the center of the vial). In the depicted embodiment, at least two tangent contact surfaces 103 of the first body 101 (e.g., top body) and at least two tangent contact surfaces 103 of the second body 102 (e.g., the bottom body) are oblique to the leveling axis and are not aligned with the horizontal (e.g., x-axis) or vertical (e.g., y-axis) directions.

In some embodiments, the component portion 122 comprises a component arm 105 configured to support the leveling vial 108. For example, in the embodiments shown in FIGS. 1A-5, the first body 101 (e.g., top body) includes a component arm 105 extending horizontally and vertically away from the firearm component axis 109 (e.g., in the positive y, negative x directions in the embodiment of FIG. 1A-1B). In some embodiments, the component arm 105 and component portion 122 may be manufactured to extend either from the left or right side of the firearm or firearm component to which the mount is attached (e.g., depending on a handedness of the user). The component portion 122 may include an opening 106 configured to receive and support the level vial 108 (e.g., at an end of the component arm 105). In some embodiments, level vials may include a protrusion 130 on at least one end (e.g., as shown in FIGS. 1A-2), which may engage a corresponding locking opening at one side of the opening 106.

In some embodiments, the component portion 122 of the mount 100 may include at least an opening 106, a recess 107, a leveling vial 108, and an illumination source 112. The illumination source 112 may be configured to improve visibility of the level vial 108 and the level vial indicator 140 therein. For example, in the depicted embodiment, the component portion 122 comprises a recess 107 within the opening 106 that supports the illumination source 112. With reference to the embodiment of FIG. 2, the depicted recess 107 is formed as part of the first body 101 inside the opening 106 at the end of the component arm 105. During assembly, the illumination source 112 (e.g., tritium vial) may first be inserted into the opening 106 to secure within the recess 107 (e.g., via press fit, snap fit, adhesive, or any known means), and the leveling vial 108 may subsequently be inserted into the opening 106.

In the depicted embodiment, the illumination source 112 may be positioned in the recess 107, and the recess 107 may be disposed at a middle of the opening 106 relative to the lateral direction (e.g., along the x-axis shown in FIGS. 1A-1B), which is laterally disposed in at least the middle of the leveling vial 108. In some embodiments, the recess 107 and illumination source 112 may extend along the entire length of the leveling vial 108 or a portion thereof (e.g., only a middle portion as shown in FIGS. 1A-1B). The illumination source 112 may thereby allow the user to visualize the level vial indicator 140 at least in the center of the leveling vial 108 to allow the user to determine when the leveling vial is showing a level position. In some embodiments, the illumination source 112 may be a tritium vial that allows long term illumination of the mount 100 without batteries or external power sources. In some embodiments any battery powered, or unpowered illumination source may be used. Thereby, the illumination source 112 (e.g., tritium vial) may allow the user of the mount 100 to easily view the leveling vial 108 and the level vial indicator 140 in darkness.

In the depicted embodiment, the opening 106 opens to an opposite side of the leveling vial 108 than the recess 107 such that the illumination source 112 is configured to be behind the leveling vial 108 relative to the user's viewpoint. With reference to FIG. 5, in some embodiments, the component portion 122 may be solid and opaque on the front side (e.g., the side viewed from the muzzle end of the firearm—shown in FIG. 5), such that the illumination source 112 is not visible.

As discussed herein, and with reference to FIGS. 1A-1B, the leveling vial 108 contains a level vial indicator 140 (e.g., bubble, plastic bead, etc.) that is easily viewable in sunlight and/or under illumination from an illumination source 112. In the depicted embodiment, the leveling vial 108 and the opening 106 are a concave-down shape, with a center of the vial being the highest point when the indicator 140 is level and in the center. In such embodiments, the indicator 140 may be buoyant within the fluid of the level vial 108. In other embodiments, the indicator may sink in the fluid of the level vial 108, and in such embodiments, the opening 106 and leveling vial 108 may be concave up to allow the indicator 140 to sink to the center when the indicator is level and in the center. In some embodiments, any known level indicator mechanism may be used.

In some embodiments, to improve visibility and mechanically improve the level indication, the component portion 122 may be offset relative to a vertical axis of the at least partially curved body surface (e.g., optical sight) 50, such that the component portion 122 is configured to extend from one side (e.g., a left or right side, the elements may be reversible) of the body surface when installed. In such embodiments, the leveling vial 108 and level vial indicator 140 may be disposed horizontally to the side of the firearm component axis 109 in an instance in which the level vial indicator 140 is at the center of the vial 108. In some embodiments, the leveling vial 108 may be offset relative to a horizontal axis in addition to or alternative to the vertical axis, such that the leveling vial may be disposed vertically above the attached surface (e.g., optical sight, such as a scope) axis 109 in an instance in which the level vial indicator 140 is at the center of the vial 108. In the depicted embodiment, the component arm 105 extends both vertically upward in the y-direction and to the lateral side in the x-direction to allow improved visibility of the level vial indicator 140 to a user holding the firearm and looking towards the mount 100 from the buttstock end of the firearm.

In various embodiment, as depicted in FIGS. 6-7, a mount 100 may be configured to engage with the at least partially curved body surface 50. In one or more embodiments, a mount 100 may adjust in circumference via adjustment of one or more threaded fastener 104, where in the first body 101 and the second body 102 securely engages with a firearm or firearm component (e.g., an optical sight). In one or more embodiments, as depicted in FIG. 6, the component portion 122 extends both vertically upward in the y-direction and to the lateral side in the x-direction to allow improved visibility of the level vial 130 to a user holding the firearm and looking towards the mount 100 from the buttstock end of the firearm.

The embodiments described herein may also be scalable to accommodate at least the aforementioned applications such as with respect to different size and configurations of firearms, different types of firearm component (e.g., optical sights, flashlights, lasers, etc.), and different sizes (e.g., circumferences) of firearm (e.g., different barrel diameters) and/or firearm component. For example, any firearm using a rotatable firearm component may be compatible with the mount 100 having a level, including but not limited to AR15 rifles, AK-variant firearms, pistols, shotguns, and the like. Various elements of embodiments described herein can be added, removed, reorganized, modified, duplicated, and/or the like as one skilled on the art would find convenient and/or necessary to implement a particular application in conjunction with the teachings of the present disclosure. For example, although one fastener 104 is shown on each side of the firearm component axis 109, two or more fasteners may be used on each side of the axis in a parallel configuration to the firearm component axis. Moreover, specialized features, characteristics, materials, elements, and/or equipment may be applied in conjunction with the teaching of the present disclosure as one skilled in the art would find convenient and/or necessary to implement a particular application in light of the present disclosure.

Many modifications and other embodiments of the present disclosure set forth herein will come to mind to one skilled in the art to which this disclosure pertains having the benefit of the teachings presented in the foregoing description and the associated drawings. Therefore, it is to be understood that the present disclosure is not to be limited to specific embodiments disclosed and that modifications and other embodiments are intended to be included within the scope of the appended claims. Moreover, although the foregoing description and the associated drawings describe example embodiments in the context of certain example combination of elements and/or functions, it should be appreciated, in light of the present disclosure, that different combinations of elements and/or functions than those explicitly described above are also contemplated as can be set forth in some of the appended claims. Although specific terms are employed herein, they are used in a generic and descriptive sense only and not for purpose of limitation.

The invention claimed is:

1. A mount for attaching a component directly or indirectly to a firearm, the mount comprising:
   at least one body defining a clamping portion and a component portion connected to the clamping portion, the clamping portion configured to engage and secure the mount directly or indirectly to the firearm;
   wherein the clamping portion defines at least two tangent contact surfaces configured to engage at least partially curved body surface.

2. The mount according to claim 1, wherein the at least two tangent contact surfaces of the clamping portion comprise four tangent contact surfaces oriented inward towards an axis and configured to face the at least partially curved body surface in an instance in which the mount is installed on the at least partially curved body surface.

3. The mount according to claim 2, wherein the at least one body comprises a first body and a second body configured to engage each other.

4. The mount according to claim 3, further comprising one or more fasteners configured to connect the first body and the second body.

5. The mount according to claim 4, wherein the two fasteners are disposed on opposite sides of the axis, and wherein the first body and the second body are configured to translate relative to each other in an instance in which the two fasteners are advanced by equal amounts.

6. The mount according to claim 3, wherein the first body defines an upper clamping portion and the second body defines a lower clamping portion, wherein the upper clamping portion and lower clamping portion are configured to at least partially surround the curved body surface.

7. The mount according to claim 6, wherein the first body further comprises the component portion.

8. The mount according to claim 6, wherein the first clamping portion and the second clamping portion are configured to define the axis therebetween in an instance in which the first body and the second body are engaged, wherein at least one of the first body and the second body comprises the at least two tangent contact surfaces, and wherein the at least two tangent contact surfaces are oriented at least partially toward the at least partially curved body surface.

9. The mount according to claim 8, wherein the at least two tangent contact surfaces comprise a first tangent contact surface and a second tangent contact surface, wherein the first tangent contact surface is parallel to the second tangent contact surface.

10. The mount according to claim 8, wherein the at least two tangent contact surfaces comprises four tangent contact surfaces, wherein each of the four tangent contact surfaces is oriented at least partially towards the axis.

11. The mount according to claim 10, wherein the first body comprises first tangent contact surface and a second tangent contact surface of the four tangent contact surfaces, and wherein the second body comprises a third tangent contact surface and a fourth tangent contact surface of the four tangent contact surfaces.

12. The mount according to claim 11, wherein the first tangent contact surface is configured to be parallel to the third tangent contact surface and the second tangent contact surface is configured to be parallel to the fourth tangent contact surface in an instance in which the first body and the second body are engaged.

13. The mount according to claim 1, wherein the component portion is configured to support a level vial.

14. The mount according to claim 10, wherein the at least two tangent contact surfaces comprise a first tangent contact surface and a second tangent contact surface, wherein the component portion defines a leveling axis of the level vial configured to be disposed horizontal in an instance in which the level vial indicator is centered, and wherein each of the at least two tangent contact surfaces is oblique to the leveling axis.

15. The mount according to claim 1, wherein the component portion comprises a recess configured to receive a tritium vial.

16. The mount according to claim 15, wherein the component portion comprises an opening configured to receive a level vial therethrough, and wherein the opening is disposed opposite the recess, such that the level vial is configured to be disposed between the tritium vial and the opening.

17. A firearm comprising the mount according to claim 1 and the component.

18. The firearm according to claim 17, further comprising a firearm accessory attached to the firearm, wherein the firearm accessory defines the at least partially cylindrical body.

19. The firearm according to claim 18, wherein the firearm accessory comprises an optical sight and the component comprises a level vial.

20. The firearm according to claim 17, wherein the firearm defines the at least partially cylindrical body.

* * * * *